US012005018B2

(12) United States Patent
Cook et al.

(10) Patent No.: US 12,005,018 B2
(45) Date of Patent: Jun. 11, 2024

(54) KNEE FLEXION DEVICE AND ASSOCIATED METHOD OF USE

(71) Applicant: The Curators of the University of Missouri, Columbia, MO (US)

(72) Inventors: James L. Cook, Columbia, MO (US); Cory Crecelius, Columbia, MO (US); Trent Guess, Columbia, MO (US); Kylee Rucinski, Columbia, MO (US); Jonathan Williams, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 17/560,731

(22) Filed: Dec. 23, 2021

(65) Prior Publication Data

US 2022/0175604 A1 Jun. 9, 2022

Related U.S. Application Data

(62) Division of application No. 16/180,783, filed on Nov. 5, 2018, now Pat. No. 11,241,353.

(Continued)

(51) Int. Cl.
*A61H 1/02* (2006.01)
*A61H 1/00* (2006.01)

(52) U.S. Cl.
CPC ............... *A61H 1/024* (2013.01); *A61H 1/00* (2013.01); *A61H 2201/0134* (2013.01);

(Continued)

(58) Field of Classification Search
CPC .. A61H 1/024; A61H 1/00; A61H 2201/0134; A61H 2201/0149;

(Continued)

(56) References Cited

U.S. PATENT DOCUMENTS 3,623,480 A 11/1971 Chisolm
4,254,949 A 3/1981 Brentham (Continued)

OTHER PUBLICATIONS

Accord Medical Products Pvt. Ltd., Physiotherapy Equipments, Varun Continuous Passive Motion Unit (knee) (Digital, Pre-Programmed), 2019, http://www.accordmedicalproducts.com/physiotherapy_equipments_cpm_unit.php, 4 pages.

(Continued)

*Primary Examiner* — Tu A Vo
*Assistant Examiner* — Kelsey E Baller
(74) *Attorney, Agent, or Firm* — Thompson Coburn LLP; Steven M. Ritchey

(57) ABSTRACT

The present invention is an apparatus and method for use in a treatment for prevention of arthrofibrosis that includes a first and a second substantially L-shaped frames, each L-shaped frame having a first member and a second member extending from the first member in a substantially perpendicular direction and terminating in a first end, a fixed plate extending between the first members of the L-shaped frames, the fixed plate being parallel with the first members of the L-shaped frames, a movable plate pivotally coupled to the first ends of the first members of the L-shaped frames with, a pneumatic piston coupled to the movable plate and the fixed plate, a hand operated valve operatively coupled to the pneumatic piston and a goniometer coupled to the movable plate and one of the L-shaped frames, the goniometer adapted and configured to indicate the angle between the movable plate and the fixed plate.

17 Claims, 5 Drawing Sheets

Related U.S. Application Data

(60) Provisional application No. 62/583,811, filed on Nov. 9, 2017.

(52) U.S. Cl.
CPC ................ *A61H 2201/0149* (2013.01); *A61H 2201/0192* (2013.01); *A61H 2201/1207* (2013.01); *A61H 2201/123* (2013.01); *A61H 2201/1238* (2013.01); *A61H 2201/1246* (2013.01); *A61H 2201/1253* (2013.01); *A61H 2201/1623* (2013.01); *A61H 2201/1628* (2013.01); *A61H 2201/164* (2013.01); *A61H 2201/1642* (2013.01); *A61H 2201/1676* (2013.01); *A61H 2201/5023* (2013.01); *A61H 2201/5056* (2013.01); *A61H 2201/5069* (2013.01); *A61H 2203/0431* (2013.01); *A61H 2203/0456* (2013.01); *A61H 2205/102* (2013.01)

(58) Field of Classification Search
CPC ...... A61H 2201/0192; A61H 2201/123; A61H 2201/1238; A61H 2201/1246; A61H 2201/1253; A61H 2201/164; A61H 2201/1642; A61H 2201/1676; A61H 2201/5023; A61H 2201/5056; A61H 2201/5069; A61H 2203/0431; A61H 2205/102
See application file for complete search history.

(56) References Cited

U.S. PATENT DOCUMENTS

| | | | | | |
|---|---|---|---|---|---|
| 4,448,412 | A * | 5/1984 | Brentham | A63B 21/4047 | 251/207 |
| 5,094,445 | A | 3/1992 | Winkelvoss | | |
| 5,181,904 | A | 1/1993 | Cook et al. | | |
| 5,320,641 | A * | 6/1994 | Riddle | A61H 1/0292 | 601/24 |
| 5,437,619 | A | 8/1995 | Malewicz et al. | | |
| 6,872,186 | B2 | 3/2005 | Branch et al. | | |
| 6,966,882 | B2 | 11/2005 | Horst | | |
| 7,112,179 | B2 | 9/2006 | Bonutti et al. | | |
| 7,445,586 | B2 * | 11/2008 | Gibson | A63B 23/0494 | 482/148 |
| 7,695,416 | B2 | 4/2010 | Weiner | | |
| 7,780,584 | B2 * | 8/2010 | Alexander | A63B 23/03541 | 482/904 |
| 8,784,343 | B2 | 7/2014 | Bonutti et al. | | |
| 9,375,599 | B1 * | 6/2016 | Simmons | A63B 21/00047 | |
| 9,669,249 | B2 * | 6/2017 | Marti | A61B 5/6828 | |
| 9,873,010 | B2 | 1/2018 | Marti et al. | | |
| 2003/0216231 | A1 * | 11/2003 | Reitz | A63B 23/035 | 482/142 |
| 2006/0064044 | A1 | 3/2006 | Schmehl | | |
| 2007/0111861 | A1 | 5/2007 | Nativ | | |
| 2009/0093353 | A1 | 4/2009 | Weiner | | |
| 2012/0253254 | A1 | 10/2012 | Rocklin | | |
| 2013/0110013 | A1 | 5/2013 | Carlson et al. | | |
| 2016/0271443 | A1 | 9/2016 | Malizia | | |
| 2017/0239119 | A1 | 8/2017 | Stewart | | |
| 2017/0340503 | A1 | 11/2017 | Turner | | |

OTHER PUBLICATIONS

Cheuy et al., "Arthrofibrosis Associated With Total Knee Arthoplasty", The Journal of Arthroplasty, 2017, pp. 2604-2611, vol. 32.

Full Range Rehab, Ez Stretch, Date Unknown, https://fullrangerehab.com/ez-stretch-knee-rehabilitation/, 2 pages.

Knee Exerciser Pro Knee Surgery, Knee Replacement Range of Motion Aide, date unknown, https://www.amazon.com/Replacement-KneePro-Exerciser-Range-Motion/dp/B00Z41T9PM?SubscriptionId=AKIAJE4WCX5DK7P5CKIA&tag=techtimes-af-20&linkCode=xm2&camp=2025&creative=165953&creativeASIN=B00Z41T9PM, 2 pages.

Medex Supply, EZ Mend Knee and Hip Rehabilitation Device, date unknown, https://www.medexsupply.com/exercise-equipment-exercise-supplies-ez-mend-knee-and-hip-rehabilitation-device-x_pid-72669.html?pid=72669&gclid=Cj0KCQiAh9njBRCYARIsALJhQkGW8BDEktJtJ2izDWMr-BJx1a5zCSYGkndV3wxg3Yy9l1DtUuqebv0aArCfEALw_wcB, 1 page.

* cited by examiner

KNEE FLEXION DEVICE AND ASSOCIATED METHOD OF USE

CROSS-REFERENCE TO RELATED APPLICATIONS

This patent application is a divisional of U.S. patent application Ser. No. 16/180,783, filed Nov. 5, 2018, which claims priority to U.S. Provisional Application No. 62/583,811, filed Nov. 9, 2017, each of which is hereby incorporated by reference in their entireties.

STATEMENT REGARDING FEDERALLY SPONSORED RESEARCH OR DEVELOPMENT

Not Applicable.

APPENDIX

Not Applicable.

SUMMARY OF THE INVENTION

This section provides a general summary of the disclosure, and is not a comprehensive disclosure of its full scope or all of its features.

An aspect of the invention provides an apparatus for use in a treatment for prevention of arthrofibrosis, the apparatus includes a first and a second substantially L-shaped frames, each L-shaped frame having a first member and a second member extending from the first member in a substantially perpendicular direction and terminating in a first end, a fixed plate extending between the first members of the L-shaped frames, the fixed plate being parallel with the first members of the L-shaped frames, a movable plate pivotally coupled to the first ends of the first members of the L-shaped frames, a pneumatic piston pivotally coupled to the movable plate and pivotally coupled to the fixed plate, the pneumatic piston adapted and configured to control an angle between the movable plate and the fixed plate, a hand operated valve operatively coupled to the pneumatic piston, the valve adapted and configured to control the flow of air into and out from the pneumatic piston such that movement of the movable plate relative to the fixed plate can be allowed and prevented by operation of the valve; and a goniometer coupled to the movable plate and one of the L-shaped frames, the goniometer adapted and configured to indicate the angle between the movable plate and the fixed plate.

Another aspect of the invention provides an apparatus for use in controlled movement of a knee, the apparatus includes a first and a second substantially L-shaped frames, each L-shaped frame having a first member and a second member extending from the first member in a substantially perpendicular direction and terminating in a first end, a fixed plate extending between the first members of the L-shaped frames, the fixed plate being parallel with the first members of the L-shaped frames, a movable plate pivotally coupled to the first ends of the first members of the L-shaped frames, a piston pivotally coupled to the movable plate and pivotally coupled to the fixed plate, the piston adapted and configured to control an angle between the movable plate and the fixed plate, and a valve operatively coupled to the piston, the valve adapted and configured to control the piston such that movement of the movable plate relative to the fixed plate can be allowed and prevented by operation of the valve.

Still another aspect of the invention provides a method for controlled movement of a knee, the method includes providing a pneumatically controlled device comprising a first and a second substantially L-shaped frames, each L-shaped frame having a first member and a second member extending from the first member in a substantially perpendicular direction and terminating in a first end, a fixed plate extending between the first members of the L-shaped frames, the fixed plate being parallel with the first members of the L-shaped frames, a movable plate pivotally coupled to the first ends of the first members of the L-shaped frames, a pneumatic piston pivotally coupled to the movable plate and pivotally coupled to the fixed plate, the pneumatic piston adapted and configured to control an angle between the movable plate and the fixed plate, a hand operated valve operatively coupled to the pneumatic piston, the valve adapted and configured to control the flow of air into and out from the pneumatic piston such that movement of the movable plate relative to the fixed plate can be allowed and prevented by operation of the valve, and a goniometer coupled to the movable plate and one of the L-shaped frames, the goniometer adapted and configured to indicate the angle between the movable plate and the fixed plate, placing a leg on the device such that a lower portion of the leg rests on the movable plate and an upper portion of the leg rests on the fixed plate, opening the valve such that the movable plate is free to move, and maintaining the valve in an open position such that the movable plate moves in a direction that decreases the angle between the movable plate and the fixed plate thereby controlling movement of the knee in flexion.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF THE DRAWINGS

The accompanying drawings, which are incorporated in and form a part of the specification, illustrate the embodiments of the present disclosure and together with the description, serve to explain the principles of the disclosure.

Figure 1:
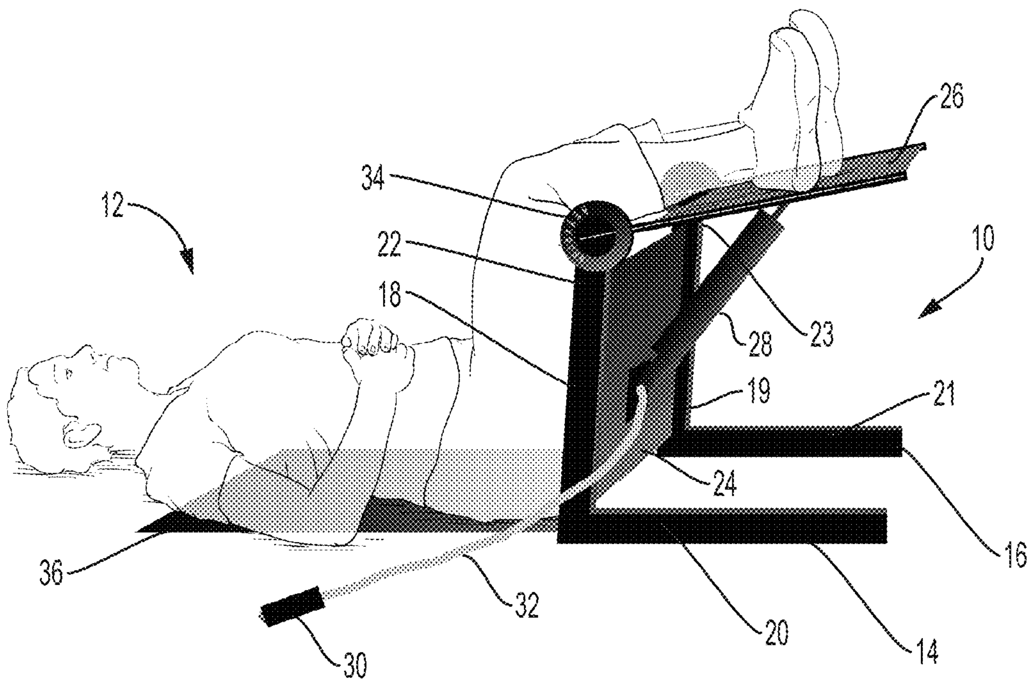
FIG. 1 illustrates a perspective view of one embodiment of a knee flexion device.

Reference characters in the written specification indicate corresponding items shown throughout the drawing figures.

DETAILED DESCRIPTION

Figure 2:
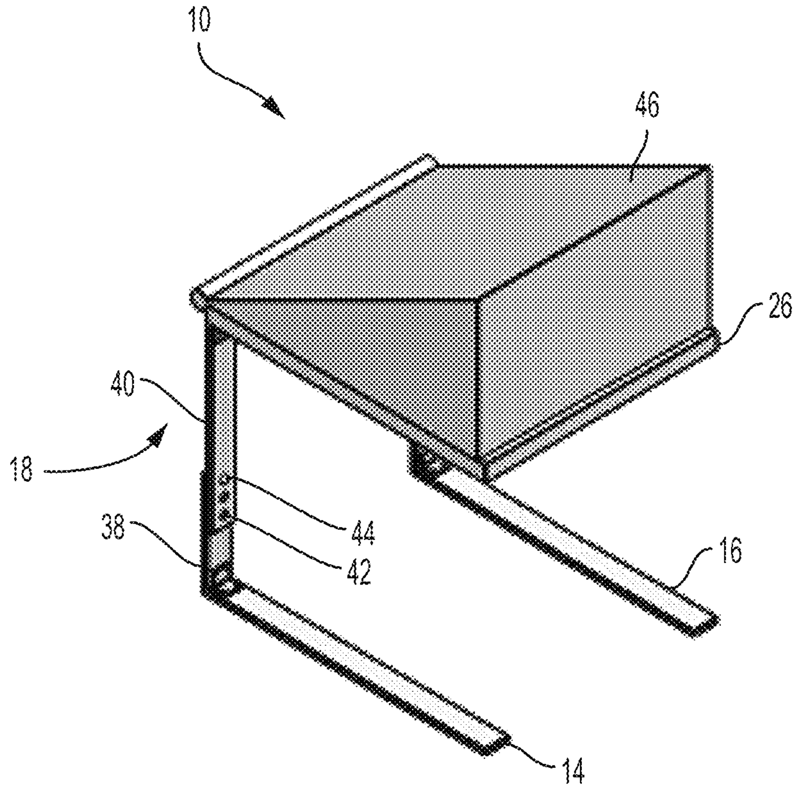
FIG. 2 illustrates a partial perspective view of one embodiment of the knee flexion device.

Referring to FIGS. 1 and 2, a knee flexion device 10 is adapted and configured to treat or prevent arthrofibrosis in a user 12 (e.g., a patient). The knee flexion device 10 includes a first substantially L-shaped frame 14 and a second substantially L-shaped frame 16. The first and second substantially L-shaped frame may deviate from an L-shape while remaining substantially L-shaped. For example, and without limitation, each L-shaped frame may not include two perfectly perpendicular members, may include additional members or components coupled to a general L-shape, or the like. Each L-shaped frame 14, 16 has a first member 18, 19 and a second member 20, 21. The first member 18, 19 extends from the second member 20, 21 in a substantially perpendicular direction and terminating in a first end 22, 23. For example, and without limitation, the first member 18 may extend from the second member 20 at an angle of between 100 and 20 degrees inclusive, of between 80 and 100 degrees inclusive, of between 85 and 95 degrees inclusive, of 90 degrees, or the like.

The knee flexion device 10 includes a fixed plate 24. The fixed plate 24 extends between the first members 18, 19 of the L-shaped frames 14, 16 and is coupled to the first members 18, 19 of both L-shaped frames. For example, and without limitation, the fixed plate 24 is coupled to the L-shaped frames 14, 16 by rivets, screws, nuts and bolts, welding, or other suitable fasteners or techniques. Alternatively, the fixed plate 24 may be integrated with the L-shaped frames 14, 16 such that all the components are an integrated one-piece construction. The fixed plate 24 is parallel with the first members 18, 19 of the L-shaped frames 14, 16.

The knee flexion device 10 further includes a movable plate 26. The movable plate 26 is pivotally coupled to the first ends 22, 23 of the first members 18, 19 of the L-shaped frames 14, 16. For example, and without limitation, the movable plate 26 is coupled to the first ends 22, 23 by one or more axles, bearings, or the like adapted and configured to permit the movable plate 26 to rotate relative to the L-shaped frames 14, 16 and the fixed plate 24.

A pneumatic piston 28 (e.g., piston and corresponding cylinder) is pivotally coupled to the movable plate 26 and pivotally coupled to the fixed plate 24. For example, and without limitation, the pneumatic piston 28 is coupled to the fixed plate 24 and the movable plate 26 by one or more axles, bearings, or the like adapted and configured to permit movement between the movable plate 26 and the fixed plate 24. The pneumatic piston 28 is adapted and configured to control an angle between the movable plate 26 and the fixed plate 24. The pneumatic piston 28 is selectably switched from a configuration that allows movement and a configuration prevents or resists movement, for example, by opening or closing a valve. The length of the pneumatic piston 28, controlled by a valve and movement of the movable plate 26, determines the angle between the movable plate 26 and the fixed plate 24.

A hand operated valve 30 is operatively coupled to the pneumatic piston 28. For example, and without limitation, the valve 30 is coupled to the pneumatic piston 28 by a length of tubing 32. The valve 30 is adapted and configured to control the flow of air into and out from the pneumatic piston 28 such that movement of the movable plate 26 relative to the fixed plate 24 can be allowed and prevented by operation of the valve 30. For example, and without limitation, when the valve 30 is closed, movement of the pneumatic piston 28 is prevented and the movable plate 26 remains stationary at a first angle with respect to the fixed plate 24. When the valve 30 is opened (e.g., by the user 12 depressing a button to open a diaphragm valve or the like), air escapes the pneumatic piston 28 as the weight of the user's legs force the movable plate 26 towards the fixed plate 24. The angle between the movable plate 26 and the fixed plate 24 decreases until the valve is closed and the movable plate 26 is fixed at a second angle relative to the fixed plate 24.

In some embodiments, the knee flexion device 10 includes a goniometer 34. The goniometer 34 is coupled to the movable plate 26 and one of the L-shaped frames 14,16. The goniometer 34 is adapted and configured to indicate the angle between the movable plate 26 and the fixed plate 24. This allows a user 12 to measure their knee flexion and track therapy progress. In some embodiments, the knee flexion device 10 includes a cushion 46 coupled to the movable plate 26.

Advantageously, the knee flexion device 10 is a non-invasive device that assists in controlled, supported and measured knee flexion exercises. For example, the knee flexion device may not be secured to the patient 12 in any way, and instead the patient's legs rest on top of the movable plate 26. This prevents the knee flexion device 10 from over extending or flexing the patient's knee to the point of injury. The knee flexion device 10 is designed to aid in improving knee flexion and overall range of motion as part of a non-operative or pre/post-operative rehabilitation program in physical therapy clinics, facilities, and at home. The knee flexion device 10 provides for controlled and measured treatment for improving knee range of motion which can, if uncontrolled, be painful, cause apprehension, be costly, or be ineffective. The knee flexion device 10 is specifically designed to safely and effectively improve knee flexion and overall knee range of motion for users 12 that suffer from knee pain. With the knee flexion device 10, patients 12 are provided the potential to reduce the need for repeat surgery, treat refractory loss of motion (arthrofibrosis), and improve their functional outcomes as a result of the advantages described herein.

The knee flexion device 10 is a device that supports the leg below the knee and allows knee flexion at a rate determined by the user 12. The device is positioned such that knee flexion aligns with the axis of rotation of the movable plate 26. The knee flexion device 10 allows a range of motion from 0 to 145 degrees, inclusive. More preferably, the knee flexion device 10 allows for a range of motion between 20 to 125 degrees, inclusive. The patient 12 begins a flexion exercise with one or both lower legs supported by the movable plate 26 and the knees at their most extended position of the exercise (typically 20-90 degrees). With the leg or legs in the starting position, the leg or legs create a flexion moment about the axis of rotation of the movable plate 26 relative to the fixed plate 24. The movable plate 26 is supported by the pneumatic piston 28, which opposes the flexion moment. To allow the knee or knees to flex, air is slowly released from the pneumatic piston 28, decreasing the length of the pneumatic piston 28 and lowering/pivoting the movable plate 26 about the axis of rotation relative to the fixed plate 24. The patient 12 can control the rate of knee flexion by increasing or decreasing the flow of air from the pneumatic piston 28, via the valve 30.

After the patient 12 has reached the desired flexion angle, the knee flexion device 10 can be reset to the desired starting position by opening the valve 30 to the pneumatic piston 28 and manually pushing the movable plate 26 up to the starting position. In alternative embodiments, a pneumatic pump (not shown) may be in fluid communication with the pneumatic piston 28 and can be activated by the user 12 to extend the pneumatic piston 28 until the starting knee flexion angle is reached. The pneumatic pump may be hand operated by the user 12 or may be driven by an electric motor. In further alternative embodiments, other types of linear motion control devices are used. For example, and without limitation, the pneumatic piston 28, the valve 30, tubing 32, and/or a pneumatic pump may be replaced by a hydraulic system (e.g., hydraulic piston, hydraulic pump, reservoir, etc.), electrically driven linear actuator, worm and worm gear, or other suitable system.

The knee flexion device is used with the patient 12 lying in a supine position as depicted. In alternative embodiments, the knee flexion device 10 is used in a sitting position. In such embodiments, the L-shaped frames include additional legs (not shown), a base plate (not shown), or the like to support the knee flexion device for use in an upright sitting position.

In some embodiments, the knee flexion device 10 can be sized to the patient by altering the height of the first members 18, 19 of the L-shaped frames 14, 16. For example, and without limitation, the first members 18, 19 may be of a tube in tube configuration (or other system having a first part 38 and a second part 40) with the height adjusted using a series of openings 42 in the outer tube 40 at various heights and a spring loaded pin 44 extending from the inner tube 38. By adjusting the length of the first members 18, 19 the height of the axis of rotation of the movable plate 26 is adjusted.

In some embodiments, the knee flexion device 10 includes a flexible fabric panel 36. The flexible fabric panel 36 is coupled to one or more of (a) the first and second substantially L-shaped frames 14, 16 and (b) the fixed plate 24. The flexible fabric panel 36 extends from a position substantially near both a first and a second juncture between the first members 18, 19 and the second members 20, 21 of each L-shaped frame 14, 16, respectively. During operation, the patient 12 lays or sits on the flexible fabric panel 36 that is attached to the base (e.g., L-shaped frames 14, 16 and the fixed plate 24), keeping the base from moving relative to the patient 12. The goniometer 34 is connected to the hinge between the base and movable plate 26 and measures knee flexion angle such that the joint angle is visible to the patient 12. The knee flexion device 10 is gentle enough to be used right after surgery as a result of the gravity assisted movement, lack of attachment to the patient 12, and patient control. In some alternative embodiments, the patient 12 can utilize straps that attach the lower leg to the L-shaped frames 14, 16 if desired.

Figure 3:
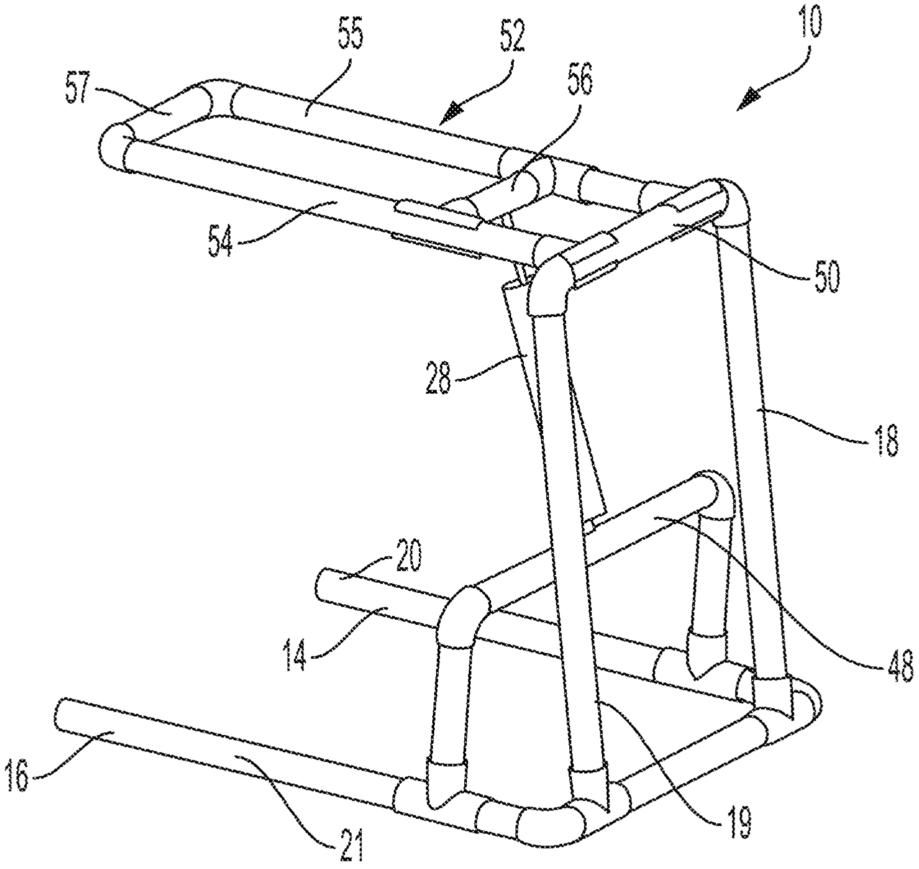
FIG. 3 illustrates a partial perspective view of an alternative embodiment of the knee flexion device.

Referring now to FIG. 3, a partial alternative embodiment of the knee flexion device 10 is illustrated. In this embodiment, the knee flexion device 10 includes L-shaped frames 14, 16. Each L-shaped frame 14, 16 has first 18, 19 and second members 20, 21 of the type described herein. Instead of a fixed plate 24, the knee flexion device 10 includes a cross-member 48. The cross-member 48 extends between the L-shaped frames. For example, and without limitation, the cross-member 48 extends up from the second members 20, 21 and between the second members 20, 21. In alternative embodiments, the cross-member 48 extends between the first members 18, 19. The knee flexion device 10 further includes a second cross-member 50 extending between ends of the first members 18, 19 opposite the second members 20, 21. Instead of the movable plate 26, the knee flexion device 10 includes a movable frame 52. The movable frame 52 includes one or more perpendicular members 54, 55 that are coupled to the second cross-member 50 such that the perpendicular members 54, 55 are able to rotate relative to the second cross-member 50. The movable frame 52 further includes one or more additional cross-members 56, 57 extending perpendicularly from the one or more perpendicular members 54, 55.

The pneumatic cylinder 28 (or other suitable component of the type described herein) is coupled to both (a) the cross-member 48 coupled to the L-shaped frames 14, 16 and (b) one of the cross-members 56, 57 (e.g., cross-member 56) of the movable frame 52. This embodiment of the knee flexion device 10 operates in the manner described with reference to other embodiments herein.

Still referring to FIG. 3, in some embodiments the knee flexion device 10 includes one or more fabric panels. For example, and without limitation, a fabric panel may be attached to the movable frame 52 to support one or more legs of the user 12. Alternatively, a piece of foam or other suitable material may surround or be attached to the movable frame 52. The knee flexion device 10 may also include a flexible fabric panel 36 of the type depicted in FIG. 1.

Figure 4:
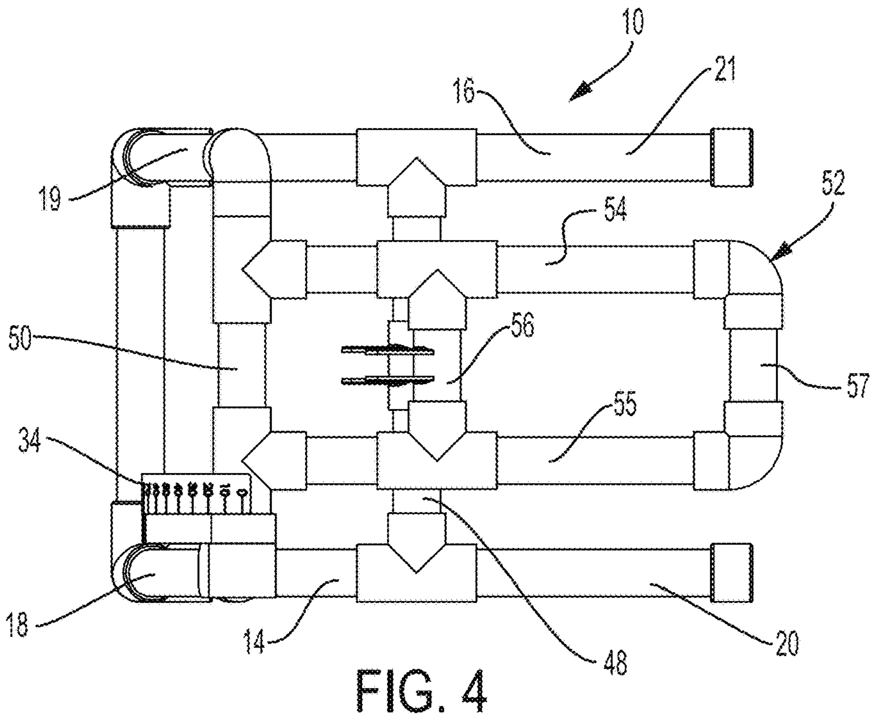
FIG. 4 illustrates a top view of a further alternative embodiment of a knee flexion device.
Figure 5:
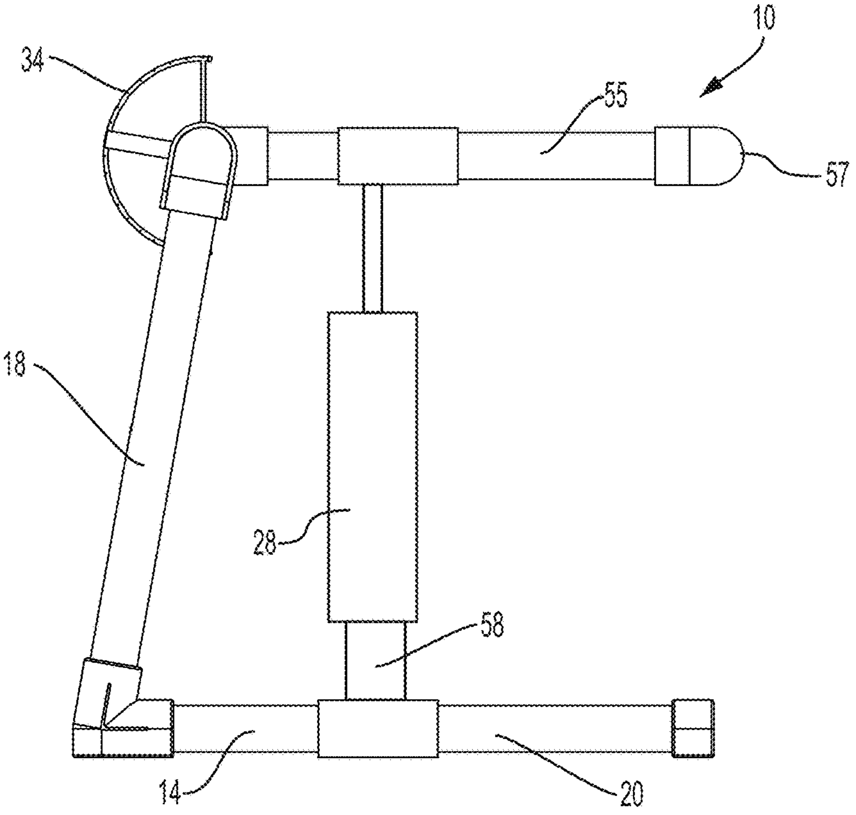
FIG. 5 illustrates a side view of the knee flexion device shown in FIG. 4.

Referring to FIGS. 4-5, an alternative embodiment of knee flexion device 10 has a different configuration of frames and members. For example, the cross-member 48 extends between first and second members 20, 21 of each L-shaped frame 14, 16 in the same plane as the first and second members 20, 21. This is in contrast to the knee flexion device 10 shown in FIG. 3 in which the cross-member 48 is elevated. The pneumatic cylinder and piston 28 is coupled to the cross-member 48 with an additional member 58.

Figure 6:
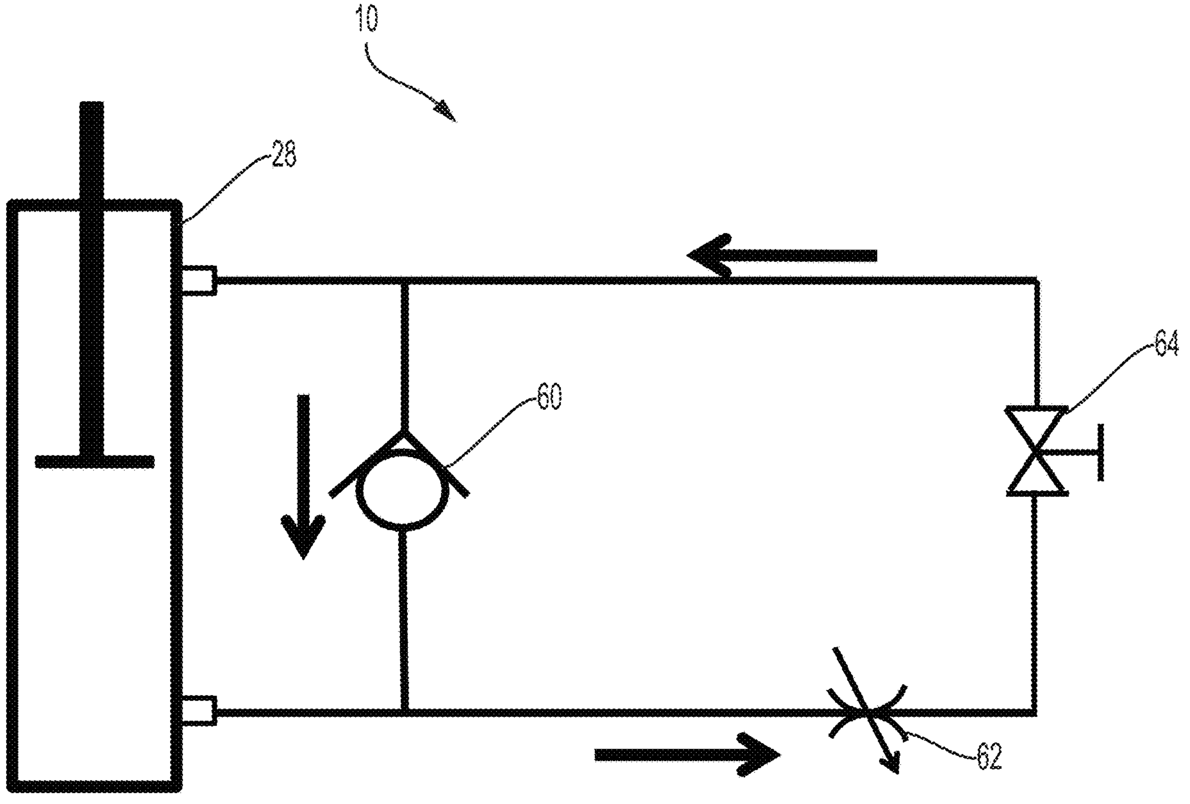
FIG. 6 illustrates a schematic view of a pneumatic system for a knee flexion device.

Referring to FIG. 6, a schematic view of one embodiment of a pneumatic system for use with a knee flexion device 10 is depicted. The cylinder 28 and the system is initially pressurized to approximately 20 pounds per square inch. Pulling up on piston rod displaces air through a check valve 60 allowing the knee flexion device to be moved to an extended knee position. The weight of the knee flex mechanism and a patient's calf and foot creates unequal pressure in the piston 28, putting greater pressure in the lower chamber of the pneumatic cylinder 28. With a push operated gate valve 64 closed, the piston 28 is held in a static position. Pushing on the gate valve mechanism 64 allows air to flow from the bottom chamber to the top chamber allowing the piston rod to move down. The rate of flow and piston rod movement can be limited via a flow control valve 62.

In view of the foregoing, it will be seen that the several advantages of the disclosure are achieved and attained.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. An apparatus for use in a treatment to assist with joint range of motion therapy of one or more knees of a patient, the apparatus comprising:

a first substantially L-shaped frame and a second substantially L-shaped frame, each L-shaped frame having a first member and a second member, the first member extending from the second member in a single direction at an angle that is fixed and substantially perpendicular to the second member and terminating in a first end, wherein the first member has a length that generally corresponds to that of a portion the patient's one or more legs from about the hips of the patient to above the one or more knees of the patient;

a fixed plate extending between and coupled to the first members of the first and second substantially L-shaped frames, the fixed plate being parallel with the first members of the first and second substantially L-shaped frames;

a movable plate pivotally coupled to and having an axis of rotation passing through the first ends of the first members of the first and second substantially L-shaped frames, wherein the movable plate is configured to support one or more legs below the one or more knees without securing the patient to the apparatus and to rotate relative to the first and second substantially L-shaped frames and the fixed plate thereby allowing knee flexion aligned with the axis of rotation of the movable plate;

a pneumatic piston pivotally coupled to the movable plate and pivotally coupled to the fixed plate, the pneumatic piston adapted and configured to control an angle between the movable plate and the fixed plate;

a hand operated valve operatively coupled to the pneumatic piston, the hand operated valve adapted and configured to control the flow of air into and out from the pneumatic piston such that movement of the movable plate relative to the fixed plate can be allowed and prevented by operation of the hand operated valve; and a goniometer coupled to the movable plate and one of the first and second substantially L-shaped frames, the goniometer adapted and configured to indicate the angle between the movable plate and the fixed plate.

2. An apparatus in accordance with claim 1, wherein the hand operated valve comprises a push button operated valve that is normally closed and is adapted and configured to open when the push button is depressed and the hand operated valve is coupled to the pneumatic piston by tubing.

3. An apparatus in accordance with claim 1, wherein each of (i) pressure within the pneumatic piston and (ii) the angle between the movable plate and the fixed plate is capable of being increased via a pump.

4. An apparatus in accordance with claim 1, wherein the pneumatic piston is a component of a pneumatic system, the pneumatic system further comprising a check valve and a flow control valve, the check valve being positioned in parallel with the pneumatic piston and such that extending the pneumatic piston causes air to be drawn through the check valve, the flow control valve being adapted and configured to control a rate of air flow within the pneumatic system and a rate at which the pneumatic piston extends and retracts.

5. An apparatus in accordance with claim 1, wherein for each of the first and second substantially L-shaped frames, the first member extends from the second member at the angle that is fixed between 80 degrees and 100 degrees, inclusive.

6. An apparatus in accordance with claim 1, further comprising a flexible fabric panel coupled to one or more of (a) the first and second substantially L-shaped frames and (b) the fixed plate.

7. An apparatus in accordance with claim 6, wherein the flexible fabric panel extends from a position substantially near both a first and a second juncture between the first and the second members of each of the first and second substantially L-shaped frames, respectively.

8. An apparatus in accordance with claim 1, wherein the apparatus is configured for use in the treatment to assist with joint range of motion therapy of one or more knees of the patient while lying in a supine position.

9. An apparatus for use in controlled movement of one or more knees of a patient, the apparatus comprising:

a first substantially L-shaped frame and a second substantially L-shaped frame, each L-shaped frame having a first member and a second member, the first member extending from the second member in a single direction at an angle that is fixed and substantially perpendicular to the second member and terminating in a first end, wherein the first member has a length that generally corresponds to that of a portion the patient's one or more legs from about the hips of the patient to above the one or more knees of the patient;

a fixed plate extending between and coupled to the first members of the first and second substantially L-shaped frames, the fixed plate being parallel with the first members of the first and second substantially L-shaped frames;

a movable plate pivotally coupled to and having an axis of rotation passing through the first ends of the first members of the first and second substantially L-shaped frames, wherein the movable plate is configured to support one or more legs below the one or more knees without securing the patient to the apparatus and to rotate relative to the first and second substantially L-shaped frames and the fixed plate thereby allowing knee flexion aligned with the axis of rotation of the movable plate;

a piston pivotally coupled to the movable plate and pivotally coupled to the fixed plate, the piston adapted and configured to control an angle between the movable plate and the fixed plate; and a valve operatively coupled to the piston, the valve adapted and configured to control the piston such that movement of the movable plate relative to the fixed plate can be allowed and prevented by operation of the valve.

10. An apparatus in accordance with claim 9, further comprising a goniometer coupled to the movable plate and one of the first and second substantially L-shaped frames, the goniometer adapted and configured to indicate the angle between the movable plate and the fixed plate.

11. An apparatus in accordance with claim 9, wherein the piston is a pneumatic piston.

12. An apparatus in accordance with claim 9, wherein the piston is a hydraulic piston.

13. An apparatus in accordance with claim 9, wherein the apparatus is configured for use in controlled movement of one or more knees of the patient while lying in a supine position.

14. A method for controlled movement of one or more knees of a patient, the method comprising:

providing a pneumatically controlled device comprising:

a first substantially L-shaped frame and a second substantially L-shaped frame, each L-shaped frame having a first member and a second member, the first member extending from the second member in a single direction at an angle that is fixed and substantially perpendicular to the second member and terminating in a first end, wherein the first member has a length that generally corresponds to that of a portion the patient's one or more legs from about the hips of the patient to above the one or more knees of the patient;

a fixed plate extending between and coupled to the first members of the first and second substantially L-shaped frames, the fixed plate being parallel with the first members of the first and second substantially L-shaped frames;

a movable plate pivotally coupled to and having an axis of rotation passing through the first ends of the first members of the first and second substantially L-shaped frames, wherein the movable plate is configured to support one or more legs below the one or more knees without securing the patient to the apparatus and to rotate relative to the first and second substantially L-shaped frames and the fixed plate thereby allowing knee flexion aligned with the axis of rotation of the movable plate;

a pneumatic piston pivotally coupled to the movable plate and pivotally coupled to the fixed plate, the pneumatic piston adapted and configured to control an angle between the movable plate and the fixed plate;

a hand operated valve operatively coupled to the pneumatic piston, the hand operated valve adapted and configured to control the flow of air into and out from the pneumatic piston such that movement of the movable plate relative to the fixed plate can be allowed and prevented by operation of the hand operated valve; and a goniometer coupled to the movable plate and one of the first and second substantially L-shaped frames, the goniometer adapted and configured to indicate the angle between the movable plate and the fixed plate;

placing one or more legs on the device such that a lower, below-the-knee portion of the one or more legs rests on the movable plate and an upper, above-the-knee portion of the one or more legs rests on the fixed plate;

opening the hand operated valve such that the movable plate is free to move; and maintaining the hand operated valve in an open position such that the movable plate moves in a direction that decreases the angle between the movable plate and the fixed plate thereby controlling movement of the one or more knees in flexion.

15. A method in accordance with claim 14, further comprising closing the hand operated valve such that the movable plate is prevented from further movement and the one or more knees is prevented from further flexion by the movable plate.

16. A method in accordance with claim 14, further comprising opening the hand operated valve and moving the movable plate such that the angle between the movable plate and the fixed plate is increased.

17. A method in accordance with claim 14, wherein the pneumatically controlled device is configured for the controlled movement of one or more knees of the patient while lying in a supine position.

* * * * *